Dec. 12, 1950     A. G. BAK     2,533,909
FADE-OUT SHUTTER FOR ATTACHMENT
TO MOTION-PICTURE CAMERAS
Filed Oct. 17, 1947     3 Sheets-Sheet 1
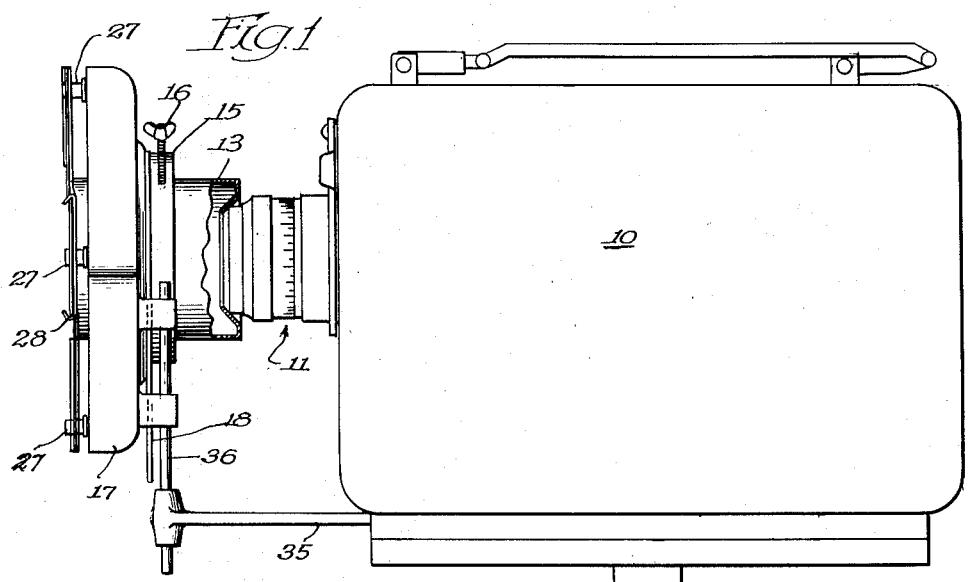
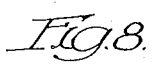     
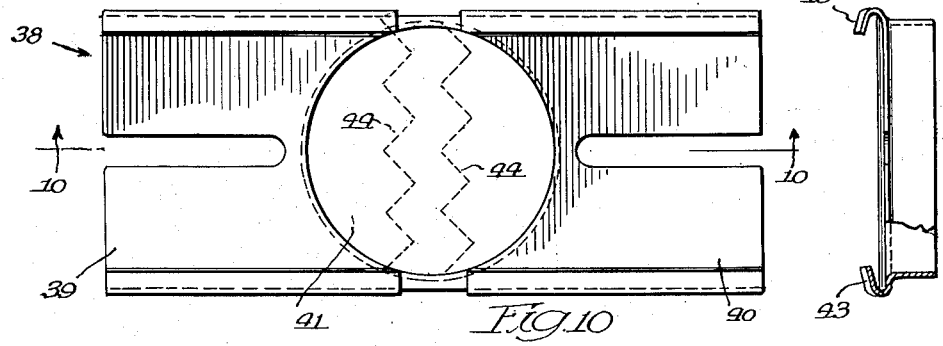
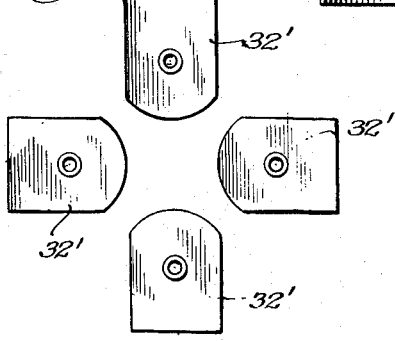
Inventor
Albert G. Bak
By: Fred Gerlach
Atty.

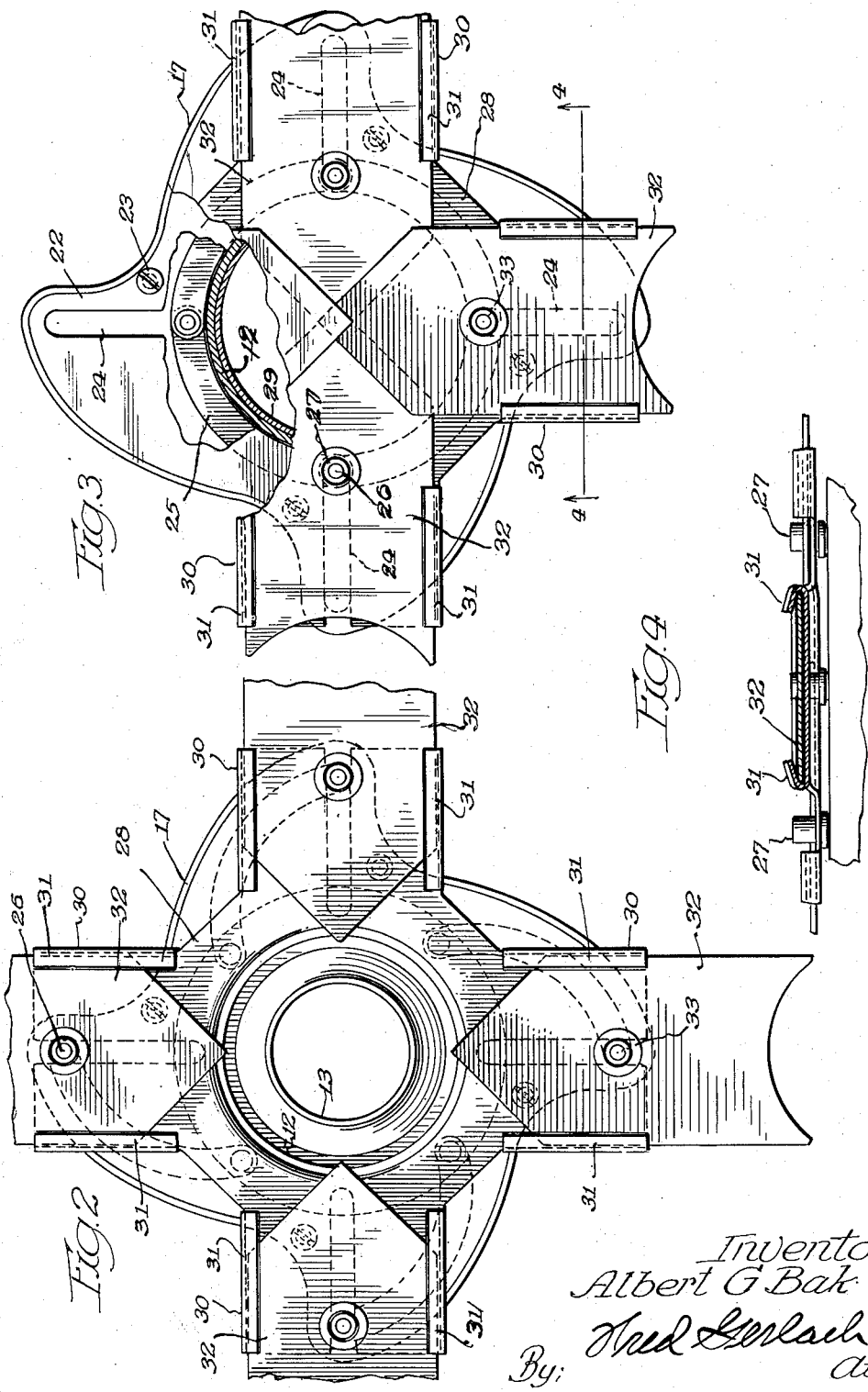

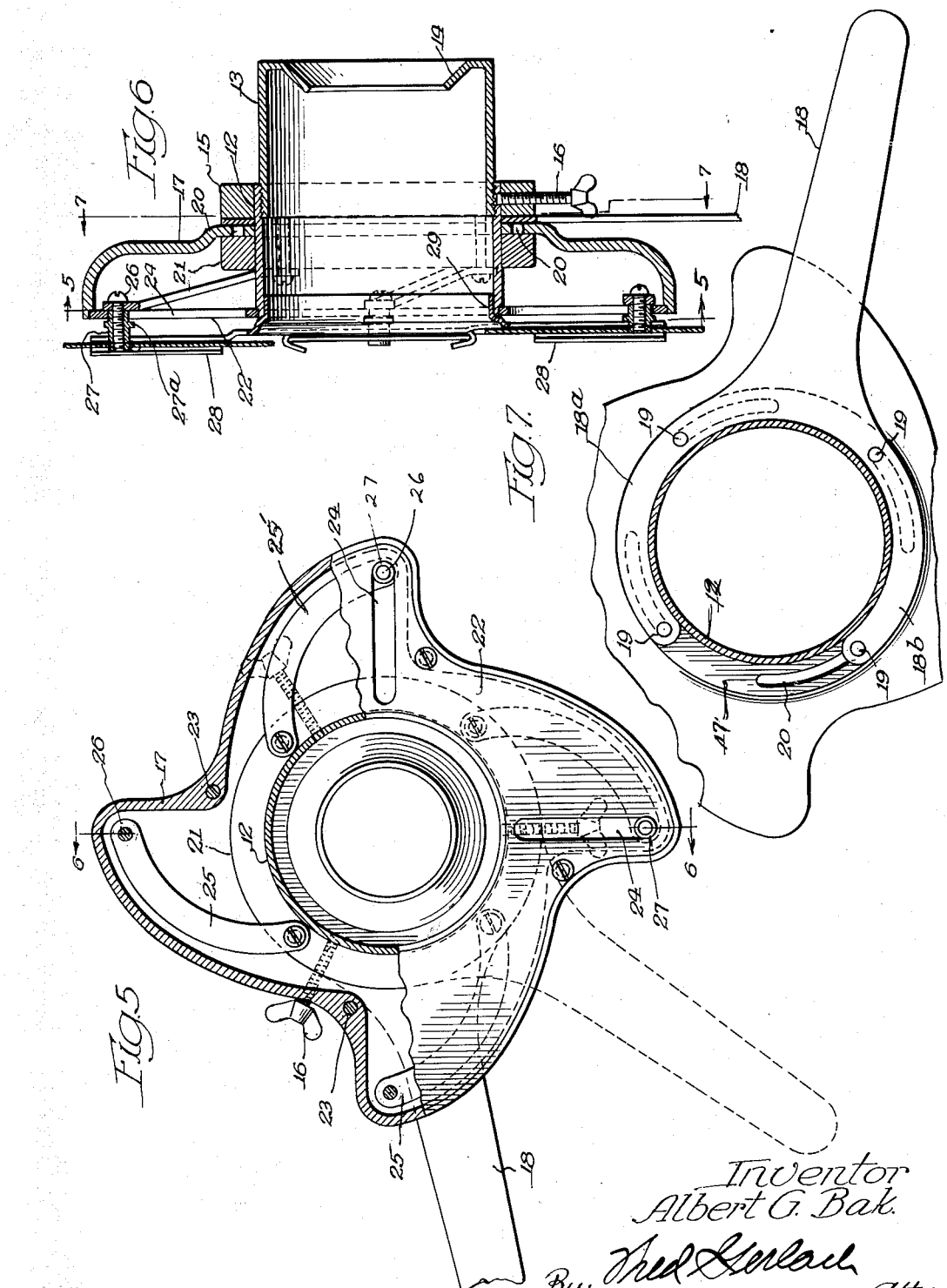

Patented Dec. 12, 1950

2,533,909

UNITED STATES PATENT OFFICE 2,533,909

FADE-OUT SHUTTER FOR ATTACHMENT TO MOTION-PICTURE CAMERAS

Albert G. Bak, Palatine, Ill.

Application October 17, 1947, Serial No. 780,518

3 Claims. (Cl. 95—56)

This invention relates to camera shutters and has to do more especially with an improved fade-out shutter which can be attached as an accessory to a motion picture camera.

The primary object of the invention is to provide a shutter in the nature of a detachable accessory which can be attached, when desired, to a motion picture camera and operated between consecutive scenes to produce fade-out and fade-in effects so as to avoid abrupt changes of scene.

Another object is to provide a device of the above-indicated character which will produce a variety of fading effects susceptible of individual selection at the will of the camera operator.

A further object is to provide a fade-out shutter which can be marketed at a low price, but which, nevertheless, is rugged and well constructed and easy to operate.

The novel features of my invention will be pointed out in connection with the ensuing description.

In the drawings which accompany this specification:

Fig. 1 is a side elevational view of a conventional motion picture camera of the amateur variety, to which is shown attached a fade-out shutter in accordance with my invention;

Fig. 2 is an enlarged front or face view of the shutter, with the shades in open or full-exposure position;

Fig. 3 is an elevational view similar to Fig. 1, showing the shades in closed position—a portion being broken away to expose certain internal details;

Fig. 4 is a sectional view taken at line 4—4 of Fig. 3;

Fig. 5 is an irregular sectional view taken along line 5—5 of Fig. 6;

Fig. 6 is a vertical sectional view taken at line 6—6 of Fig. 5;

Fig. 7 is a section taken at line 7—7 of Fig. 6;

Fig. 8 is a face view of a shade-holding frame designed to accommodate two shades instead of four and capable of being substituted in place of the four-shade frame of Figs. 1 to 6 inclusive;

Fig. 9 is an endwise view of Fig. 8;

Fig. 10 is a section taken at line 10—10 of Fig. 8; and

Fig. 11 depicts a group of four shades which may be substituted for the shades shown in Fig. 2—the purpose of this view being merely to illustrate that shades of various configurations can be utilized to produce a variety of fade-out effects.

The motion picture camera as a whole is identified in Fig. 1 by reference number 10 and includes a lens structure 11, which may be removable to permit substitution of a wide angle lens. The device of the present invention is adapted for use with the more usual type of lens such as that shown and, alternatively, with a wide angle type lens; and, where necessary, may readily be modified to accommodate almost any style of lens which might be employed.

As shown most clearly in Fig. 6, the subject device includes a permanent or principal tube 12 which is threaded internally at its rear end to engage an externally threaded extension tube 13—which latter is designed to be removed when a wide angle lens is to be employed or whenever it may be expedient to substitute another and different extension tube to accommodate some special lens structure.

The extension tube 13 is flanged inwardly at its rear end and the flange is formed with a frustro-conical seat 14 which is adapted to closely engage the outer end of the lens barrel—being adapted by virtue of the frustro-conical seat to accommodate lenses of various diameters. It is not necessary to have an absolutely close fitting joint between the lens barrel and the seat 14, but it is desirable to exclude the transmission of light through that joint, so far as practicable, because of possible reflections back into the lens.

An annular collar 15 is pressed onto the rear of tube 12 and is drilled and tapped to receive three thumb screws 16 which are equally spaced circumferentially. These thumb screws are employed to center and anchor the device on a wide angle lens, not shown—the extension tube 13 being detached when a wide angle lens is used. A wide angle lens being of large diameter will nearly fill the bore of tube 12, thus necessitating removal of extension tube 13.

Also mounted on tube 12 are a ring 21 and a housing member 17, which latter may be a casting of plastic material. The housing member 17 may be a snug fit on tube 12, but the ring 21 must be free to rotate thereon and constitutes a part of the operating mechanism for actuating the shades.

Between the rear face of housing member 17 and the front face of collar 15 there is interposed a bifurcated end portion of a lever 18, which may be a sheet metal punching. Said bifurcated end portion consists of two complementary arcuately shaped arms 18a and 18b (see Fig. 7) each of which is drilled to receive two pins 19 which are pressed into or otherwise fixed securely to ring 21 and which pass through arcuate slot-like openings 20 in housing member 17. By virtue of these slot-like openings, lever 18 is capable of rotating ring 21—said lever being intended to be operated manually to rotate said ring in one direction or the other, depending upon whether the shutter is to be opened or closed. The length of each slot 20 is such as to permit an adequate angular movement of lever 18 but no more.

The preferred configuration of housing member 17, as viewed from the front, is shown in Fig. 5, and it is thus formed in order to avoid obstructing the view finders of certain motion picture cameras.

A sheet metal face plate 22 having a peripheral configuration substantially corresponding to that of housing member 17 is centered on the front end of tube 12 and seated in a peripheral recess formed in housing member 17, as most clearly depicted in Fig. 6. Said face plate is secured to the housing member by screws 23 and is perforated to form four radial slots 24 which are spaced in quadrature.

Four links 25, curved to conform to the outside radius of tube 12, are disposed in quadrature and each pivotally connected at one end to ring 21, the distal end of each link being drilled to receive the screws 26 onto which is threaded a sleeve 27. Each screw 26 extends through a slot 24 as does also the inner end portion of the attached sleeve 27. Each said sleeve is formed with an external flange 27a having a diameter greater than the width of slot 24—said flanges serving to locate the sleeve lengthwise. Each sleeve 27 constitutes what is referred to in certain of the appended claims as a pin, and each pin is slidably movable in its slot 24 along a radial path defined by the slot.

As viewed in Figs. 2, 5 and 6, the pins comprising sleeves 27 are positioned at the outer ends of their respective slots 24, and the ring 21 is in a corresponding position of rotation; but if ring 21 is rotated counterclockwise, as viewed in Fig. 5, the effect thereof is to cause sleeves 27 to move along their respective slots toward the axial center of tube 12. It will be apparent that since links 26 are identical, the pins are at all times equidistant from the axial center of tube 12; and it will further be apparent that by moving lever 18 said pins can be moved in and out equally and simultaneously along radial paths. It is not essential that the slots 24 actually extend radially from the axial center of tube 12, but it is preferable that they extend at least approximately radially from said center.

Disposed in front of and lying in a plane approximately parallel to face plate 22 is a frame 28 formed of sheet metal and having a central aperture defined by an annular hub 29 which projects into and is a snug spring fit in the bore of tube 12, being thus detachably secured to tube 12 and centered thereon. Said frame 28 has four radially projecting arms 30 spaced in quadrature, the opposite lateral edges 31 of said arms being folded over, as best shown in Fig. 4, to form a channel or guideway, in each of which guideways is slidably mounted a flat piece 32 herein referred to as a shade. The four shades 32 may be made of sheet metal or sheet fiber or of sheet plastic material or any other suitable substance which is opaque and which preferably will not warp. As depicted in Figs. 2 and 3, each shade 32 is of pointed configuration at its inward end and of concave configuration at its outer end, and each shade has an eyelet 33 designed to receive and engage the outer end of one of the sleeves or pins 27—said sleeves or pins being operative to move the shades along their respective guideways toward and away from the axis of tube 12. In Fig. 2 the four shades are shown in their outermost positions wherein they present no obstruction to light entering the bore of tube 12; but in Fig. 3 they are shown in their innermost positions wherein they overlap and are effective conjointly to completely obstruct passage of light into the bore of the tube. The frame 28 is so formed that the four shades 32 lie in different planes so that they do not interfere when moved inwardly.

Frame 28 can easily be detached from tube 12 and when detached the shades are no longer engaged by sleeves 27 and can be withdrawn from the frame. Then, if desired, the shades can be reversed end-for-end in their guideways.

In operation, lever 18 usually is moved rather slowly so that the shades open and close somewhat gradually, thus causing the consecutive scenes to be faded in and out instead of changing abruptly.

Various fadeout and fade-in patterns can be obtained by providing shades of different endwise configurations—each set of shades being capable of providing two patterns, as will be evident.

In Fig. 11 there is shown, by way of example, a group of four shades 32′ each differing from shades 32 in that one end is convex, instead of concave, while the other end is square instead of pointed. This, obviously, will produce a different fade pattern than either the pointed ends or the concave ends of the shades shown in Figs. 2 and 3. As will be self-evident, there is almost no limit to the variety of fadeout patterns capable of being effected through the provision of corresponding shade configurations.

For the purpose of supporting the subject device there is shown attached to the camera base, in Fig. 1, an arm 35 which carries at its distal end a post 36 to which housing member 17 is secured. The arm 35 is adjustably movable lengthwise relatively to the camera, thus providing for movement of the shutter toward and away from lens 11.

In Figs. 8, 9 and 10 there is illustrated a frame of alternative design which may be substituted in place of the four-arm previously described. Here the frame, as a whole, is identified by reference numeral 38 and comprises two arms or guideways 39 and 40 which extend oppositely from a central aperture 41 defined by an annular hub 42, which may be identical with hub 29 of the four-arm frame. The opposite lateral margins 43 are folded over, as best shown in Fig. 9, so as to overlie the edges of the shades which are slidably mounted in the guideways. The shades have been omitted from the showing of Figs. 8-10 in the interest of clarity, but the complementary inner edges thereof are indicated in dotted outline at 44 in Fig. 8. I have indicated these edges as being serrated so as to produce a saw tooth fade-out pattern, but that is only one of innumerable configurations which might be selected. The two arms 39 and 40 are slotted lengthwise to clear the pins 27 which engage the two shades. Upon inspection of Fig. 10, it will be seen that the two arms 39 and 40 are disposed in different planes so that the two shades carried thereby are offset sufficiently to clear each other when moved inwardly. The same provision is made in the design of the four-arm frame 28.

Obviously, there are numerous possible modifications and alternative arrangements within Having described my invention, what I claim as new and wish to secure by Letters Patent is:

1. A fade-out shutter adapted for attachment to a motion picture camera, comprising: a light-transmitting tube, a frame mounted at one end of said tube and having a plurality of angularly spaced arms extending outwardly from the tube in a plane normal to the axis of the tube, each of said arms comprising a guide and having a lengthwise extending slot, a plurality of shades each slidably mounted in one of said guides, individually, and movable therein toward and away from each other and toward and away from the axis of said tube, said shades being effective, conjointly, to close the bore of said tube against admission of light but movable outwardly from the tube to form an opening for entry of light into the tube bore, a ring encircling said tube and manually rotatable therearound through a limited angle, and a plurality of links each pivotally connected at one end to said ring, the other end of each link having a pin which extends through one of said slots and engages one of said shades, the arrangement being such that said pins move lengthwise of said slots in response to rotation of said ring and thereby propel said shades to open and close said bore.

2. A fade-out shutter adapted for attachment to a motion picture camera, comprising: a light-transmitting tube, a face plate mounted at one end of said tube and having a central aperture to admit light into the bore of said tube, said face plate extending normally to the axis of the tube and having a plurality of slots extending radially to the axis of the tube, a member carried by said tube and forming, conjointly with said face plate, a housing, a ring encircling said tube within said housing and manually rotatable around said tube through a limited angle, a sheet metal frame mounted adjacent said face plate exteriorly of said housing and having a plurality of arms extending radially from said tube and spaced angularly therearound, each of said arms comprising a guide, a plurality of shades slidably mounted in said guides, individually, and each movable in a path radial to the tube axis, said shades being movable simultaneously and effective, conjointly, to open and close said aperture, and a plurality of links, each pivotally connected at one end to said ring and each having a pin at the other end which extends through one of said slots and engages one of said shades, said slots being effective to guide said pins each in a path parallel to the path of movement of its associated shade, the arrangement being such that said shades are movable simultaneously by said links in response to rotation of said ring.

3. A fade-out shutter adapted for attachment to a motion picture camera, comprising: a light-transmitting tube, a housing member encircling and carried by said tube, a face plate mounted at one end of said tube and carried by said housing member, said face plate having a plurality of slots extending radially from the axis of said tube, a ring encircling and carried by said tube within said housing member, a plurality of links pivotally connected to said ring at circumferentially spaced points, each of said links having a pin at the end thereof remote from said ring which pin projects through one of said slots individually and is guided thereby for movement in a path radial to the axis of the tube, said ring being manually rotatable about said tube through a limited angle and thereby effective to slidably move said pins along said slots simultaneously so that said pins are always equidistant from the axis of the tube, a lever for rotating said ring and connected to said ring by means of a plurality of pins which pass through arcuate slots formed in said housing member, a sheet metal frame having a plurality of arms extending radially from the axis of the tube, and a plurality of shades, each of said arms forming a guide in which one of said shades is slidable radially to the axis of the tube, each of said shades having an aperture engaged by one of said pins, the arrangement being such that said shades are movable simultaneously by said pins.

ALBERT G. BAK.

REFERENCES CITED

The following references are of record in the file of this patent:

UNITED STATES PATENTS

| Number | Name | Date |
| --- | --- | --- |
| 532,327 | Levy | Jan. 8, 1895 |
| 973,020 | Fisk | Oct. 18, 1910 |
| 1,755,175 | Dina | Apr. 22, 1930 |
| 2,148,508 | Seitz | Feb. 28, 1939 |
| 2,305,664 | Bogopolsky | Dec. 22, 1942 |